Patented Sept. 16, 1952

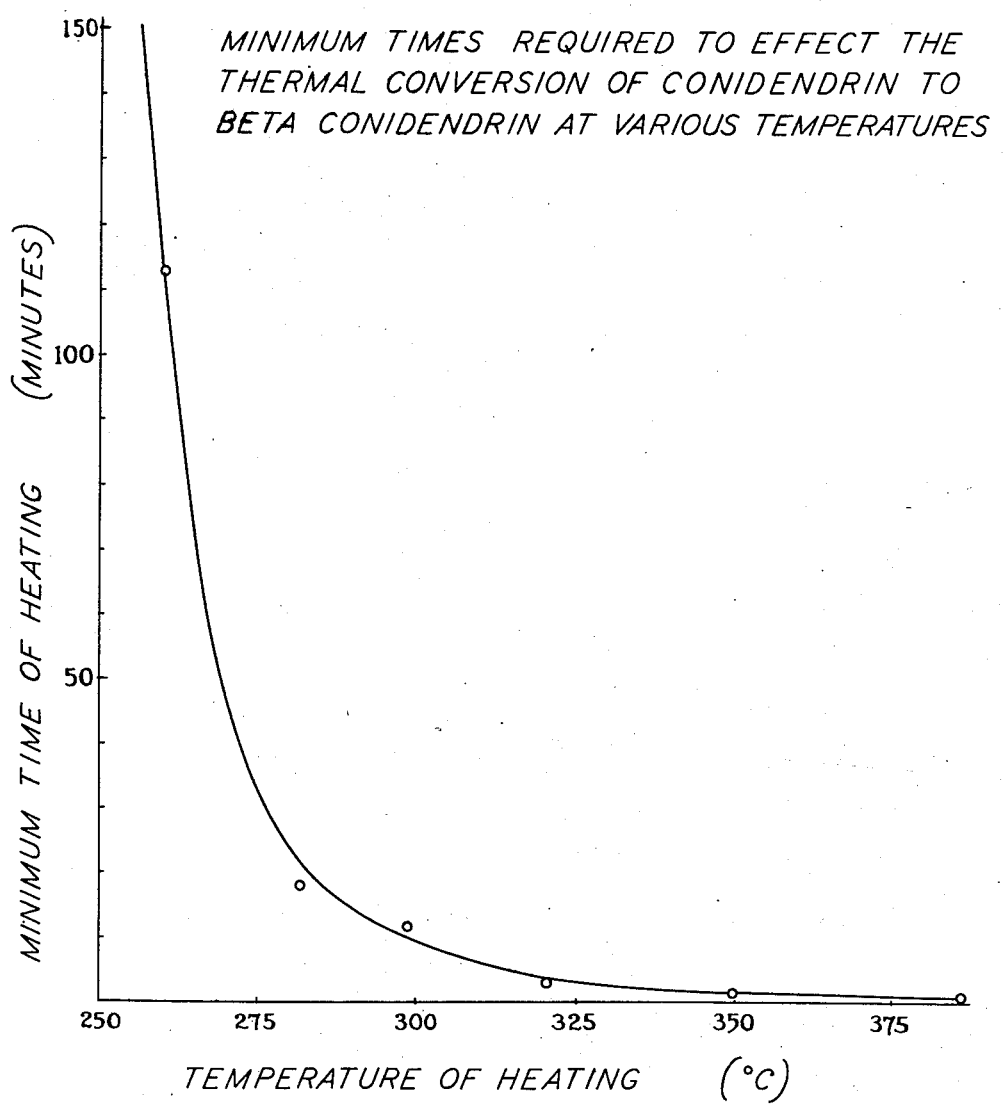

2,610,970

UNITED STATES PATENT OFFICE 2,610,970

THERMAL PROCESS FOR BETA CONIDENDRIN MANUFACTURE

William M. Hearon, Camas, Wash., and Viron V. Jones, Hyattsville, Md., assignors to Crown Zellerbach Corporation, Camas, Wash., a corporation of Nevada Application September 16, 1950, Serial No. 185,244

8 Claims. (Cl. 260—344.6)

The present invention relates to a process for the production of beta conidendrin and more particularly pertains to a thermal process for the conversion of conidendrin to its beta isomer.

Conidendrin is an organic chemical compound found naturally in the wood of trees of many species, including the spruces and hemlocks, particularly western hemlock. It has the following formula:

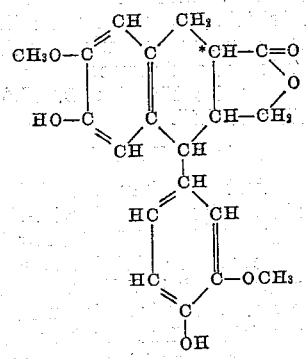

Because of its structure, conidendrin is capable of existing as two stereoisomers which may be converted one to the other by an inversion occurring in the configuration around the carbon atom adjacent the carbonyl group of the lactone ring, indicated by an asterisk in the above structural formula. The normal or alpha form is that which is found in the native state and isolated from sulphite waste liquor as described above. It melts at about 250–255° C. and has an optical rotation of $a_D^{20}$ —54.4 ($C=3.984$, acetone.

The beta conidendrin obtained by the inversion of the alpha product, on the other hand, melts at about 203–208° C. and has an optical rotation of $a_D^{25}$ +32.5 ($C=4$, acetone). Although it is a relatively new product available heretofore only in extremely limited quantities, it has potential utility as an antioxidant for rubber and for foods, and as a starting material in the manufacture of fine chemicals for the pharmaceutical and dye industries. Since it has phenolic groups in its molecular structure, it also is of potential value in the production of specialty resins.

Two processes have been developed heretofore for making beta conidendrin. In the first (Holmberg, Ann. Acad. Sci. Fennicae 29A, 3–15 (1927)), conidendrin is heated at about its melting point (255–260° C.) for a time period of 16 hours, the beta conidendrin product being recovered by sublimation. In the second (Holmberg Ber. 54, 2389–2406 (1921)), conidendrin is treated with sodium ethoxide in absolute ethyl alcohol and the beta conidendrin product obtained by crystallization from the latter. Neither of these prior art procedures is adaptable to the large scale production of beta conidendrin, however, since they require long periods of time, result in a relatively inferior product, and require comparatively tedious isolation procedures.

It, therefore, is a principal object of the present invention to provide a process for the large scale conversion of conidendrin to beta conidendrin.

It is another object of the present invention to provide a process whereby conidendrin may be converted to its beta isomer with great speed and in high yields.

Still another object of the present invention is the provision of a process whereby beta conidendrin may be produced in a substantially pure state.

Still a further object of the present invention is the provision of a process for the production of beta conidendrin wherein the conidendrin may be recovered completely and expeditiously.

The manner in which the foregoing and other objects of this invention are accomplished will be apparent from the following specification and claims considered together with the single figure of the drawings comprising a graph illustrating the relationship between reaction time and temperature in effectuating the conversion of conidendrin to beta conidendrin.

The basis of the present invention is the unexpected discovery that, whereas the inversion of conidendrin to its beta isomer occurs with difficulty and very slowly at the melting point, it occurs many times more rapidly and results in a substantially pure product when the reaction temperature is maintained above the melting point of the starting material. At these elevated temperatures, decomposition of the conidendrin does not occur as might be expected, unless the heating is entirely excessive. Rather, the conversion to the beta isomer is quantitative and extremely rapid being completed in a matter of a few minutes.

Thus, generally stated, the presently described process for the production of conidendrin comprises heating conidendrin to a temperature above its melting point but below its decomposition temperature and maintaining it at such temperature until its conversion to the beta isomer is substantially complete. More specifically stated, the presently described beta conidendrin manufacturing process comprises heating conidendrin at a temperature of above 260° C. but below about 360° C. and maintaining the conidendrin within this temperature range until it has been converted to beta conidendrin. In a preferred embodiment, the present invention comprises converting conidendrin to beta conidendrin by heating it at a temperature of between about 290° C. and about 330° C. for a time period of between about 2 minutes and about 30 minutes, the time period decreasing with increase in the temperature employed.

The presently described process employs as a raw material the conidendrin normally obtained from wood by extraction or recovered from sulphite waste liquor. The conidendrin does not have to be free of impurities, and even crude material containing wood fibers is satisfactory.

The conidendrin starting material is placed in a suitable reaction vessel supplied with heating means. It then is brought to the predetermined conversion temperature and maintained there preferably with stirring or other form of agitation until the inversion of the conidendrin to the beta isomer is complete. This may be predetermined by means of trial runs, or by withdrawing samples from the molten reaction mixture from time to time and determining the melting points of the withdrawn samples. As the reaction progresses, the melting point of the reaction mixture decreases from an original value of 250-255° C. to a final value of 203-208° C. when the inversion is complete. Melting points between these extremes indicate that a mixture of the two conidendrin forms is present, it being kept in mind that there is no depression of the melting point caused by the contemporaneous presence of the two isomers in admixture with each other. The contrary is true, however, where decomposition products are present so that, if the melting point drops below the melting point of beta conidendrin, i. e. below 203-208° C., this is an indication that the reaction temperature is too high and that decomposition of the material is occurring.

After the conversion reaction is complete, the beta conidendrin product may be recovered from the reaction vessel in any suitable manner, as by pouring the molten mass into water, separating the resulting solid product from the water, and drying it. It may then be applied in its recovered form to many uses. However, if a purer product is desired, it may be recrystallized from a suitable solvent such as acetone or methyl alcohol.

In another embodiment of the invention, the heat required to convert the conidendrin to beta conidendrin may be supplied by superheated steam introduced directly into the conidendrin. In this case, the steam serves the dual function of elevating the temperature by the desired amount and also of steam distilling the beta conidendrin from the reaction mixture as it is formed in an unusually pure condition. The resulting mixture of steam and beta conidendrin then may be condensed in a condenser of suitable construction, whereupon the pure beta conidendrin product may be separated from the condensed moisture. In this case, the temperature of the inversion may be relatively high, for example as high as 370-400° C., possibly because the reaction takes place rapidly and the beta conidendrin is removed from the high temperature zone by the steam as soon as it is formed. Thus this modification of the presently described process affords a very rapid process for preparing beta conidendrin and has the ancillary advantages of producing an exceptionally pure product and of removing it from the reaction mixture as it is formed.

The presently described process is illustrated in the following examples.

EXAMPLE 1

A reaction vessel containing 1,111 grams of conidendrin was heated on a hotplate at 300° C. for 15 minutes. The light amber colored melt was poured into five liters of water while stirring vigorously, causing the mass to break into small particles. The nearly white product was filtered and dried in an oven at 100° C. The yield was quantitative and the melting point of the crude material was 203-207° C. By recrystallizing from the minimum amount of boiling acetone, an 89% yield of a white crystalline solid was obtained. The melting point of this material with a known sample of beta conidendrin showed no depression.

*Beta conidendrin diacetate.*—A mixture of 10 g. of the product prepared by the above procedure, 10 ml. of acetic anhydride and a drop of concentrated sulfuric acid was warmed until a reaction occurred, as was evidenced by spontaneous refluxing. The solution was cooled in an ice bath. The solid mass which precipitated was filtered and dried. The yield was 12 g. (99%). After recrystallizing from ethanol, the melting point of the diacetate product was 201 to 203° C. Its analysis was as follows:

Calculated for $C_{24}H_{24}O_8$: C, 65.4; H, 5.49. Found: C, 65.4; H, 5.45.

EXAMPLE 2

A two-liter metal beaker containing 1,090 g. of conidendrin was heated with a Meeker burner. The conidendrin melted at 260° C. and the temperature was elevated to 300° C. in eight minutes. The melt was poured into 5 liters of water while stirring vigorously, causing the mass to break into small particles. The product was filtered and dried in an oven at 100° C. The yield was quantitative and the melting point of the crude product was 203-206° C.

EXAMPLE 3

A tube containing 10 g. of conidendrin was immersed in a metal bath held at 325° C. After 30 minutes, the melt was poured into a mortar, allowed to solidify and ground to a powder. This was dissolved in 400 ml. of boiling xylene and cooled in an ice bath. The product after filtering and drying weighed 7.9 grams (79%). The melting point was 198-204° C. One recrystallization from methanol brought the melting point to 203-207° C. A mixed melting point with beta conidendrin showed no depression.

EXAMPLE 4

A 50-gram sample of conidendrin contained in a 150 ml. distilling flask was heated in a metal bath. A test tube resting in a pan of cold water served as a receiver. When the bath temperature reached 260° C., the conidendrin melted. At 360° C. gentle decomposition occurred and a thick syrup distilled into the receiver leaving a dark carbonaceous mass in the distilling flask.

EXAMPLE 5

This example illustrates the remarkably high degree of acceleration of the conversion of conidendrin to beta conidendrin with increase in temperature.

Several series of capillary tubes each containing a few mg. of conidendrin were sealed off to exclude air and immersed in a metal bath held at the specified temperature. At various time intervals one tube was removed. The end of the capillary opposite the sample was opened, the capillary placed in a hot melting point apparatus and crystallization stimulated by agitating with a platinum wire. As soon as the sample had solidified, the melting point was taken. The results of the tests are summarized in the table.

Table

| Series | Temp. of Bath (°C.) | Minimum time for Sample Melting Point to reach 205–208° C. (Minutes) |
|---|---|---|
| A | 260 | 150 |
| B | 281 | 20 |
| C | 298 | 12 |
| D | 320 | 3 |
| E | 349 | 1 |
| F | 385 | ½ |

These results are plotted in the single figure of the drawings and bring out clearly that, up to a temperature of about 275° C., the rate of conversion acceleration is extremely rapid. However, beyond this temperature, the rate drops off becoming substantially constant at about 330° C. and up to the decomposition temperature of the material. The illustrated time-temperature relationship may be represented mathematically by the following equation which fits the curve of the drawing within experimental error and wherein $t$ is the minimum time required to heat conidendrin for complete conversion to beta conidendrin at any temperature T.

$$\text{Log}_{10} t = \frac{2.531 - \log_{10} T}{0.0566}$$

EXAMPLE 6

This example illustrates the application of a steam distillation technique to the preparation of beta conidendrin by the presently described process.

A quantity of conidendrin contained in a distillation vessel was heated to a temperature of 270–280° C. by passing superheated steam therethrough. The resulting steam-beta conidendrin mixture was passed into a condenser, where the beta conidendrin solidified. After drying, the solid product was obtained in a 99% yield. It melted at 206–208° C. and its mixed melting point with a known sample of beta conidendrin showed no depression.

EXAMPLE 7

The steam distillation procedure of Example 6 was repeated but at a reaction temperature of 320–330° C. In this case, the entire product had distilled over in 20 minutes. A 91% yield was obtained melting at 203–208° C.

EXAMPLE 8

The steam distillation procedure of Example 6 was repeated at the elevated temperature of 370–400° C. In this case, all of the beta conidendrin had distilled over after 8 minutes. A 93% yield of a product melting at 200–208° C. was obtained.

Thus it will be apparent that, by the process of the present invention, we have provided a very rapid method of converting conidendrin to its beta isomer. The process may be effectuated furthermore in relatively simple equipment and results in the formation of a substantially pure product in almost quantitative yields. Still further, the recovery of the product is relatively simple and may be effectuated by the same means employed in making the conversion, i. e. by means of a simple steam distillation.

Having thus described our invention in its preferred embodiments, we claim:

1. The process for producing beta conidendrin which comprises heating impure alpha conidendrin to a temperature at least about 5° C. above its melting point but below its decomposition temperature and maintaining it at said temperature until its inversion to the beta isomer is substantially complete.

2. The process of producing beta conidendrin which comprises heating conidendrin to a temperature of between 260° C. and about 360° C. and maintaining it at said temperature until the reaction is complete.

3. The process of producing beta conidendrin which comprises heating conidendrin at a temperature of between about 290° C. and about 330° C. until it has been completely converted to beta conidendrin.

4. The process of converting conidendrin to beta conidendrin which comprises heating conidendrin at a temperature of between 260° C. and about 360° C. for a time of between about 2 minutes and about 150 minutes, the time of heating being decreased with increase in temperature.

5. The process of making beta conidendrin which comprises passing steam at a temperature of between about 275° C. and about 400° C. through molten conidendrin, thereby converting the same to beta conidendrin, and contemporaneously removing the beta conidendrin from the reaction mixture by steam distillation.

6. The process of converting conidendrin to beta conidendrin which comprises passing superheated steam through melted conidendrin, the temperature of the conidendrin being maintained at least about 5° C. above the melting point of conidendrin but below its decomposition temperature, steam distilling the beta conidendrin from the reaction mixture as it is formed, and recovering the beta conidendrin from the steam distillate.

7. The process of converting conidendrin to beta conidendrin which comprises contacting superheated steam with melted conidendrin at a temperature of between 260° C. and about 400° C., thereby converting the same to beta conidendrin, and removing the beta conidendrin from the reaction mixture by steam distillation.

8. The process of producing beta conidendrin which comprises heating conidendrin to a temperature of between 260° C. and about 360° C. and maintaining it at said temperature until a substantial proportion of the conidendrin has been converted to beta conidendrin.

WILLIAM M. HEARON.
VIRON V. JONES.

REFERENCES CITED

The following references are of record in the file of this patent:

Pearl: J. Org. Chem. 10, 219–221 (1945).
Erdtman et al.: Acta Chem. Scand., vol. 3 (1949), pp. 982–984.